(12) United States Patent
Baker et al.

(10) Patent No.: US 6,706,194 B2
(45) Date of Patent: Mar. 16, 2004

(54) METHOD FOR REMOVAL OF CHLORAMINES FROM DRINKING WATER

(75) Inventors: Frederick Stanley Baker, Wando, SC (US); Jane Fiona Byrne, Mount Pleasant, SC (US)

(73) Assignee: MeadWestvaco Corporation, Stamford, CT (US)

(*) Notice: Subject to any disclaimer, the term of this patent is extended or adjusted under 35 U.S.C. 154(b) by 0 days.

(21) Appl. No.: 10/144,201

(22) Filed: May 10, 2002

(65) Prior Publication Data

US 2003/0209498 A1 Nov. 13, 2003

Related U.S. Application Data

(63) Continuation-in-part of application No. 10/141,158, filed on May 8, 2002.

(51) Int. Cl.[7] ............................... C02F 1/28; C02F 1/58
(52) U.S. Cl. ...................................... 210/668; 210/679
(58) Field of Search ................................ 210/660, 668, 210/679, 763

(56) References Cited

U.S. PATENT DOCUMENTS

| | | | |
|---|---|---|---|
| 4,624,937 A | * 11/1986 | Chou | 502/180 |
| 5,338,458 A | * 8/1994 | Carrubba et al. | 210/668 |
| 5,444,031 A | 8/1995 | Hayden | 502/180 |
| 5,637,232 A | * 6/1997 | Hayden | 210/763 |
| 6,136,189 A | * 10/2000 | Smith et al. | 210/266 |
| 6,342,163 B1 | 1/2002 | DeLonge et al. | 210/749 |

* cited by examiner

*Primary Examiner*—Ivars Cintins
(74) *Attorney, Agent, or Firm*—Terry B. McDaniel; Daniel B. Reece IV

(57) ABSTRACT

This application discloses a method for enhanced removal of chloramines from a fluid media by contacting said media with a catalytic activated carbon. The catalytic activated carbons used in the present invention may be prepared from carbon materials that have been contacted or otherwise exposed to nitrogen-containing compounds at temperatures above 700° C., and preferably are in the form of a solid carbon block.

10 Claims, 6 Drawing Sheets

Influence of Binder on Chloramine Reduction Performance of Invention Carbon and Prior Art Carbon Product

METHOD FOR REMOVAL OF CHLORAMINES FROM DRINKING WATER

This patent application is a continuation-in-part of co-pending application Serial No. 10/141,158, having the same title and filed on May 8, 2002.

BACKGROUND OF THE INVENTION

1. Field of the Invention

The present invention relates to improvements in the use of a high-performance, catalytically activated carbon for the removal of chloramines from chloramine-containing fluid streams. In particular, this application relates to the use of high-performance, catalytically activated carbon block filters for the removal of chloramines from chloramine-containing fluid streams.

2. Description of the Prior Art

While chlorination has made the U.S. water supply safe from illness producing bacteria, viruses, and parasites, an unhealthy by-product of chlorinating water that contains natural organics is the production of trihalomethanes, which have been linked to increased risk of cancer. One way to reduce this risk is to change from chlorine disinfection to chloramine disinfection. Chloramines are formed from the reaction between ammonia and chlorine. Thus, adding ammonia ($NH_3$) to a chlorination system converts chlorine to chloramines. Specifically, monochloramine, hereafter referred to as "chloramine," in low concentrations arise from the disinfection of potable water sources. To improve the taste and odor of the water and to remove the inherently toxic chloramine, the water is typically contacted with activated carbon. The ability of carbonaceous materials, such as activated carbon, to remove chloramine from aqueous streams is generally well known. It is also known that improvements in removal of chloramine can be achieved by reducing the mean particle diameter of the carbon and by increasing the carbon bed contact time. In some applications, such as in kidney dialysis units, high removal rates of chloramine are particularly important. Although parameters such as contact time and mean particle diameter are known to affect chloramine removal efficiencies, removal performance is neither well understood nor particularly effective.

Activated carbon is used in the treatment of water in the form of powdered actvated carbon, granular activated carbon, or shaped activated carbon, such as pellets or spheres. Another form of shaped activated carbon often recommended for point-of-use (POU) and point-of-entry (POE) water treatment, however, is solid block activated carbon. Block activated carbon is a compressed blend of selected activated carbon and a binder material, such as high-density polyethylene (HDPE), which is capable of adsorbing a wide range of organic materials. Water is forced through the pores of the densely compacted carbon block, where a combination of mechanical filtration, electrokinetic adsorption, and physical/chemical adsorption takes place to reduce or eliminate a wide range of contaminants.

U.S. Pat. No. 5,338,458, issued on Aug. 16, 1994 to Carrubba et al., titled "Method for Removing Chloramine with Catalytic Carbon," teaches an improved process for the removal of chloramine from gas or liquid media by contacting said media with a catalytically-active carbonaceous char. In practice, however, a product manufactured according to the patent teaching has been found lacking in effectiveness for chloramine removal from drinking water. Additionally, attempts to replicate even the relatively poor performance of the commercial product based on the '458 patent (Centaur®) in solid block form has not been satisfactory. Apparently, the impact of the binder component detracts measurably from the prior art carbbn's performance for chloramine removal.

Accordingly, it is the object of the present invention to provide an improved method of removal of chloramine from drinking water. It is a further object of the invention to provide an activated carbon that is catalytically active for removal of chloramine apart from factors such as extended contact time, mean particle diameter, and the like which factors are known to affect removal of chloramine. Finally, it is an object of this invention to provide an improved method of chloramine removal using an activated carbon that is catalytically active for removal of chloramine in the form of a solid block activated carbon.

SUMMARY OF THE INVENTION

Generally, the present invention comprises a method for enhanced removal of chloramine from aqueous media by contacting said media with a catalytic activated carbon. The catalytic activated carbons used in the present invention may be prepared from carbon materials that have been contacted or otherwise exposed to nitrogen-containing compounds at temperatures above 700° C.

The carbonaceous feedstocks from which such carbons are produced are relatively nitrogen-poor, naturally occurring materials, such as lignocellulosic materials and coals. The lignocellulosic materials may include carbons derived from wood, olive pits, and various nut shells, including coconut. The nitrogen-poor feedstocks may be processed as low-temperature carbonized chars or as high-temperature carbonized chars such as activated carbons. Either carbon may be oxidized prior to, during, or after carbonization. However, all nitrogen-poor chars must be contacted or otherwise exposed to nitrogen-containing compounds such as ammonia, urea or the like at high temperatures prior to, during, or after calcination, pyrolysis, and/or activation at high temperatures with a gasifying agent, such as steam or carbon dioxide. Additionally, it is essential that the final products in all cases described above be cooled to temperatures below 400° C., preferably 200° C., in an oxygen-free or otherwise inert atmosphere. In the invention of a block carbon, after treating the carbon it is blended with a binder material and the blend is shaped to a desired forrn. In a preferred embodiment, the binder material is an organic compound, such as a polymer, which has been heated to a temperature at least above its glass transition temperature (preferably, above its melting point), and the blend is shaped as desired prior to resolidification of the binder. Alternatively, the binder material may also be inorganic, such as one or more clays.

The catalytic activated carbons of the present invention are distinguished from prior art carbons by their ability to extract a greater amount chloramine from drinking water more rapidly. When tested under nearly equivalent conditions of contact time, mean particle diameter, concentration of chloramine, and the like, these catalytic activated carbons remove chloramine much more effectively than prior art carbon materials, which have been used for this application in the past, including the carbonaceous chars of U.S. Pat No. 5,338,458. Other advantages of the present invention will become apparent from a perusal of the detailed description of the presently preferred embodiments.

DESCRIPTION OF THE PREFERRED EMBODIMENT(S)

Figure 1:
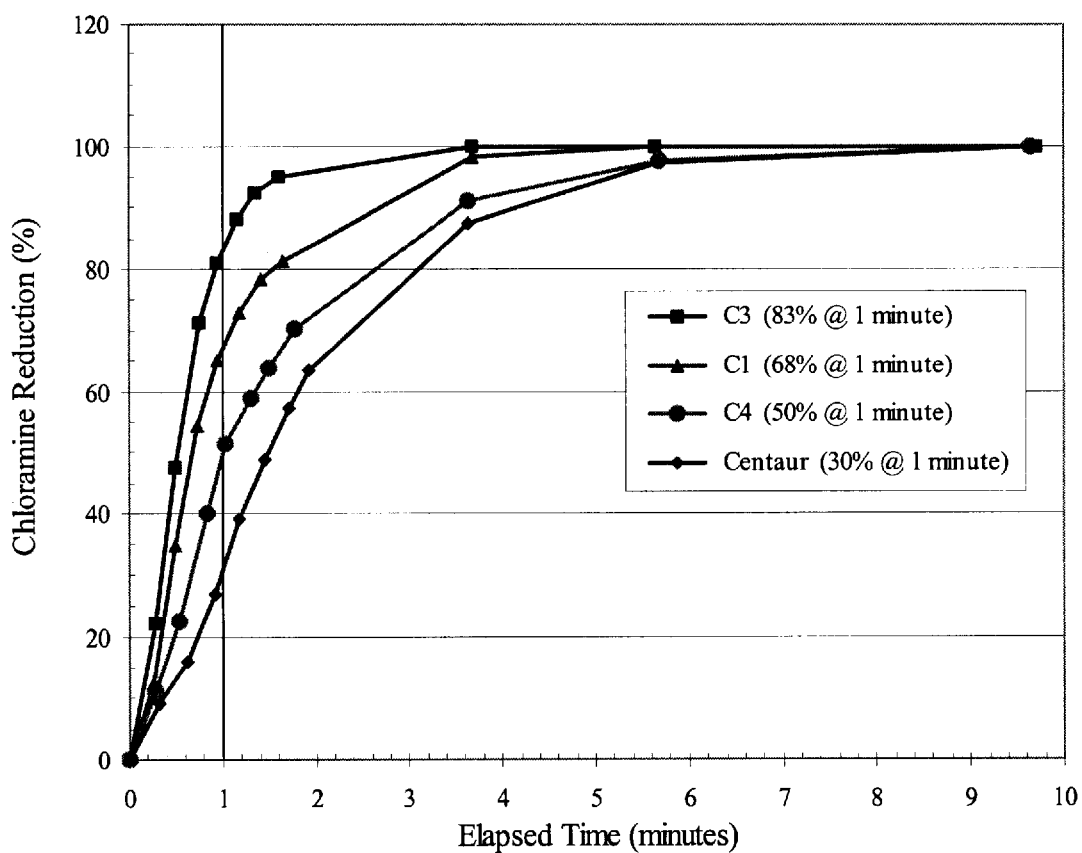
FIG. 1 is a graphical representation of chloramine-reduction performance of invention carbon products and prior art carbon product on a gravimetric basis.

As noted above, potential toxicity, unpleasant taste, and odor are associated with the use of chloramine disinfection by potable water-treatment plants. Also, as noted, the prior art teaches that effective removal of chloramine from water requires a catalytically-active carbonaceous char, which has been characterized as a carbon that will rapidly decompose hydrogen peroxide in aqueous solution. It is the object of this invention, more specifically, to provide a catalytic activated carbon that exhibits high performance for chloramine removal from water, yet may possess relatively low activity for hydrogen peroxide decomposition compared to prior art carbons. It is a further objective to demonstrate that the invention process for removal of chloramine employing said catalytic activated carbon is an unexpected and surprising (in light of the prior art teaching) improvement over prior art process performance in removing chloramine employing prior art carbons.

While it is appreciated that the U.S. Pat. No. 5,338,458 patentees disclose "activated carbon" as among their taught "catalytically-active carbonaceous chars," it is noted that the catalytic activated carbon disclosed herein is distinguished from the '458 teaching and is distinctive in its surprising and unexpected (based on the '458 teaching) properties for the removal of chloramine.

The catalytic activated carbon of the present invention is prepared by the method disclosed in U.S. Pat. No. 4,624,937, which disclosure is incorporated herein, by reference. The '937 patent teaches a method for catalytically oxidizing tertiary amines or secondary amines in the presence of oxygen or an oxygen-containing gas to selectively produce secondary or primary amines, which method comprises the step of treating the carbon catalyst to remove oxides from the surface thereof. In a preferred embodiment of the '937 patent teaching, the surface oxides on the carbon are removed by pyrolyzing the carbon material at a temperature in the range of about 800° C. to about 1200° C. while simultaneously passing a gas stream of an oxygen-containing gas and NH3 through the carbon material in a ratio of up to 90:10 for a time sufficient to remove surface oxides from the carbon. More particularly, the '973 patent teaches the carbon treatment gas stream to include a $NH_3$/oxygen-containing gas mixture from the group consisting of $NH_3/CO_2$, $NH_3/O_2$, $NH_3/H_2O$, and $NH3/NO_X$, and preferably the $NH_3$/oxygen-containing gas mixture is $NH_3/H_2O$.

Using industry-accepted protocols, the invention catalytic activated carbon product was evaluated against Calgon Carbon's Centaur® catalytic carbonaceous char product (taught in U.S. Pat. No. 5,338,458) for the reduction of chloramine in drinking water. The applicants' found that at chloramine concentrations typical for drinking water the invention carbon has a substantial performance advantage over Centaur with respect to both volumetric capacity and kinetics of eliminating chloramine from drinking water. Furthermore, contrary to the teaching of Calgon Carbon's '458 patent, the applicants have demonstrated that high performance for removal of chloramine can be obtained using carbons that exhibit relatively low catalytic activity as determined by a surrogate "t¾ time" test. (In a variation of the t¾ time test, considered to be equivalent to the t¾ test procedure patented by Calgon Carbon (U.S. Pat. No. 5,470,748), instead of monitoring the rate of decomposition of hydrogen peroxide in the presence of an activated carbon by measuring the temperature of the hydrogen peroxide solution under essentially adiabatic conditions, the applicants measured the weight loss resulting from the evolution of oxygen during the carbon-catalyzed decomposition of the hydrogen peroxide under otherwise similar conditions of hydrogen peroxide concentration, carbon loading, and pH, etc. Reference to this surrogate t¾ test will be in quotation marks.)

In fact, the "t¾ time" of some of the carbons that exhibited at least twice the chloramine removal performance of Centaur was over 100 minutes, well outside the broadest claim of the '458 patent (<15 minutes).

Chloramine Reduction

Data obtained through the applicants' own experiments on the invention catalytic activated carbons and related carbon products confirmed the superior performance of the invention catalytic activated carbon for removal of chloramine from water. The example below was the results of tests run on the carbon products (≧90%–325 mesh) using a concentration of chloramine near 3 ppm, a typical level for drinking water, at a temperature of 21° C. (70° F.). The chloramine solution was prepared by blending one liter of a solution of ammonium chloride (1.500 g $NH_4Cl$) in water with one liter of a solution containing sodium carbonate (1.250 g $Na_2CO_3$) and Chlorox household bleach (6% NaOCl, 12 ml) in water. This stock solution, containing about 300 ppm of chloramine ($NH_2Cl$), was equilibrated at 21° C. for one hour. A solution containing about 3 ppm chloramine was prepared by diluting 10.0 ml of the stock solution to one liter with water. The actual concentration of the diluted chloramine solution was determined using the calorimetric procedure described in Example 1 (with the omission of the carbon). This test solution of chloramine was equilibrated at 21° C. for one hour before use. All solutions were prepared on the day of the tests using high purity water and, with the exception of the Chlorox bleach, analytical grade reagents.

For the purpose of characterizing the chloramine removal performance of a given carbon product, it can be assumed that, under the conditions of preparation of the chloramine solutions, all the chlorine in the test solution is present in the form of monochloramine, $NH_2Cl$. The high ratio of $NH_4Cl$ to NaOCl (5:1, compared to a stoichiometric ratio of 1:1) used in the preparation of the solutions ensured that the reaction between the ammonium chloride and the sodium hypochlorite would be driven rapidly towards the production of the monochloramine species. Furthermore, the pH of the test solution was about 8.3, a value consistent with the range in which "chlorine" is present in the solution as the monochloramine species; i.e., not as "free chlorine" (HOCl or OCl) or dichloramine ($NHCl_2$) or trichloramine ($NCl_3$).

Supporting documentation in this respect can be found in, for example: the USEPA Guidance Manual "Alternative Disinfectants and Oxidants" (April 1999, pp. 6-1 to 6–35); in the Hach Company's Booklet Number 17, "Current Technology of Chlorine Analysis for Water and Wastewater" by Daniel L. Harp (1995, pp. 1–30); and in the Hach Company's Monochloramine Application Note reprinted from the article, "Specific Determination of Inorganic Monochloramine in Chlorinated Wastewaters" (*Water Environment Research*, 75(6), pp. 706–713).

EXAMPLE 1

An amount of 400 g of water containing chloramine (about 3 ppm) was equilibrated at a temperature of 21° C. An amount of 200 mg (±1%) of the carbon test sample was added to the stirred solution and a stopwatch started to record elapsed time. 10 ml aliquots of the carbon/water suspension were removed at periodic intervals and immediately filtered to remove the carbon from treated water. The actual time of filtration of an aliquot of the carbon/water suspension was recorded as the elapsed time for that aliquot. The aqueous filtrates were analyzed for chloramine content immediately following collection of all aliquots of the carbon/water suspension. Working with one filtrate at a time, a DPD (N, N-diethyl-p-phenylenediamine) reagent "pillow" for total chlorine determination (Hach Company, Catalog Number 21056-69) was added to the filtrate (10 ml) and the sample vial shaken for 20 seconds to develop the characteristic magenta color of the "Wurster dye" DPD-oxidation product. The absorbance of the filtrate at a wavelength of 515 nm was measured and the concentration of chloramine remaining in the water was calculated using the appropriate calibration. Because the Wurster dye can also be formed through the reaction of free chlorine with DPD, a similar set of measurements was made using a free chlorine reagent "pillow" (Hach Company, Catalog Number 21055-69) instead of the total chlorine reagent "pillow." The absence of color development confirmed that free chlorine was not interfering with the analysis for chloramine. Finally, a "blank" colorimetry measurement was made on water used to prepare the chloramine solutions to ensure that the absorbance at 515 nm was ±0.001. Chloramine reduction data were normalized to 200.0 mg of carbon (dry weight) to compare data for different products.

Data are shown in FIG. 1 and Table I for a series of carbon products isolated from the production process described in the '937 patent under various conditions of ammonia and steam flows. Data for the prior art Centaur product are included for comparison. FIG. 1 compares the chloramine reduction curves for representative carbon products over the 10-minute time frame of the test. Table I summarizes the amount of chloramine removed by the carbons at a contact time of one minute, a useful point for comparing the performances of different carbon products.

TABLE I

| Carbon Sample | "t-¾ time" (minutes) | Chloramine Removed (% at 1 minute) |
|---|---|---|
| C1 | 115 | 68 |
| C2 | 6.8 | 81 |
| C3 | 3.2 | 83 |
| C4 | 330 | 50 |
| C5 | 14.5 | 65 |

TABLE I-continued

| Carbon Sample | "t-¾ time" (minutes) | Chloramine Removed (% at 1 minute) |
|---|---|---|
| C6 | 4.3 | 75 |
| Centaur | 21 | 30 |

It is apparent from FIG. 1 and Table I that all the invention catalytic carbon products exhibited much faster kinetics of chloramine removal from water than Centaur. For example, at an elapsed time of one minute, the invention C3 product reduced the chloramine concentration by 83% compared to only a 30% reduction for the Centaur product. Given the low contact time in water-treatment filters, the kinetics of chloramine removal are of considerable importance with respect to point-of-entry (POE) and point-of-use (POU) filters for residential use and commercial use (e.g., restaurants, beverage manufacture).

EXAMPLE 2

The performance data discussed in Example 1 (FIG. 1 and Table I) were determined using equivalent weights of catalytic carbon products, namely 200 mg. However, POE and POU filters for water-treatment applications contain cartridges of certain standard dimensions, and therefore accommodate a certain fixed volume of filtration medium. Depending on the nature of the precursor material from which a carbon product is produced, the density of different catalytic carbon products can vary widely, resulting in different weights of the respective products in a fixed volume of a filter cartridge. For the case in point, the invention carbons were produced from wood, whereas the Centaur product was produced from coal. For comparable particle sizes, i.e., $\leq 90\%-325$ mesh, the apparent density of the coal-based Centaur product is about twice that of the wood-based invention carbons. In practice, this means that a cartridge filter of a given volume can hold twice the weight of the Centaur product than of, in this example, a wood-based carbon.

Figure 2:
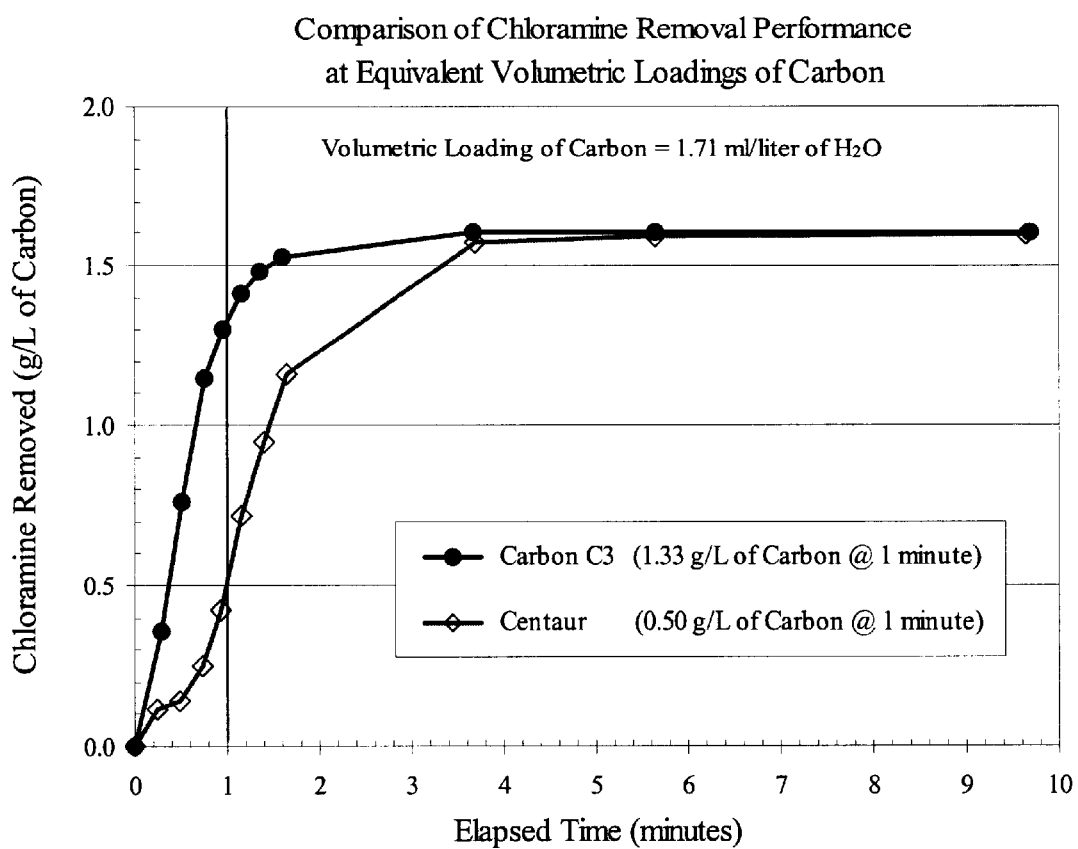
FIG. 2 is a graphical representation of chloramine-reduction performance of invention carbon products and prior art carbon product on a volumetric basis.

If, for the purpose of illustration only, the Centaur and invention carbons exhibited equal chloramine removal performances on a gravimetric (weight) basis, it would be expected that the denser Centaur product would exhibit about twice the performance of the invention carbon on a volumetric basis. As the data in FIG. 1 and Table I demonstrate, however, the gravimetric-based performance of the Centaur product falls far short of the invention carbons at contact times less than one minute. Nevertheless, tests were run on equivalent volumes of the Centaur product and invention carbons to further demonstrate the superior chloramine removal performance of the invention carbons. The tests were run using the procedure described in Example 1, with the exception that the weight of Centaur used in the test was 400 mg, compared to 200 mg of the invention carbons. These weights corresponded to a volume loading of 1.71 ml of carbon per liter of test water. Representative data are shown in FIG. 2 for the Centaur product and invention carbon C3. The chloramine removal performances are expressed in the volumetric-based units of g of chloramine removed per liter of carbon.

Clearly, the invention carbon still exhibited substantially superior performance compared to the Centaur product, despite the fact that the Centaur product was present in the test water at twice the weight of the invention carbon. In fact, it is also clear from FIG. 2 that the performance of the Centaur product at contact times below one minute did not increase in proportion to the doubling of the weight of Centaur product present in the test water. Because the removal of chloramine from water is a result of the catalytic reduction of the chloramine by the carbon, it does not necessarily result that twice the weight of a given product doubles the rate of removal of chloramine from the water. The nature of the time-dependent curve in FIG. 2 for the Centaur product also reveals another reason why the performance of the Centaur product did not increase in proportion to the weight used. Namely, the "S-shaped" character of the curve at the low contact times relevant to practical use (in POE and POU filters) indicates that the Centaur product was slow to "wet" in the test water, which impeded its ability to catalyze the desired reaction.

Catalytic Activity

The catalytic activity of the catalyst plant products and Centuar was measured using the surrogate "t¾ time" test. The procedure and results are set forth in Example 3.

Example 3

The t¾ time is defined (U.S. Pat. Nos. 5,338,458, 5,356,849, and 5,470,748) as the time at which three-quarters (75%) of the maximum temperature rise has occurred during the decomposition of hydrogen peroxide by a carbon material. It is assumed that this time corresponds to 75% decomposition of the available hydrogen peroxide. In the surrogate "t¾ time" test used to characterize the catalytic activity of the invention carbon products, the decomposition of the hydrogen peroxide solution was monitored through the weight loss resulting from the evolution of oxygen. In keeping with Calgon Carbon's definition, the "t¾ time" was assumed to correspond to the point at which 75% of the theoretical weight loss of oxygen from the available hydrogen peroxide had occurred. The weight of carbon, volume of hydrogen peroxide solution, and concentration of the hydrogen peroxide solution were similar to those employed in the Calgon Carbon test. Similarly, the reaction medium was buffered at pH 7.

The "t¾ time" test data are summarized in Table I, above. Examples of the weight loss curves used to calculate the "t¾ times" for the invention carbon products are shown in FIG. 3.

It is clear from Table I that the invention carbon products exhibited a wide range of "t¾ times," from 3.2 to 330 minutes, yet all exhibited high performance for removal of chloramine from water; i.e., 50–83% reduction, compared to only 30% for Centaur. More to the point, the "t¾ times" of the C1 and C4 products, 115 and 330 minutes, respectively, were substantially greater than the primary claim in the '458 (chloramine use) patent, which is limited to carbon products exhibiting t¾ times of less than 15 minutes, which would suggest to one skilled in the art that the invention carbon products C1 and C4 are unsuitable for chloramine removal as compared to the catalytically-active carbonaceous chars of the '458 patent.

Figure 3:
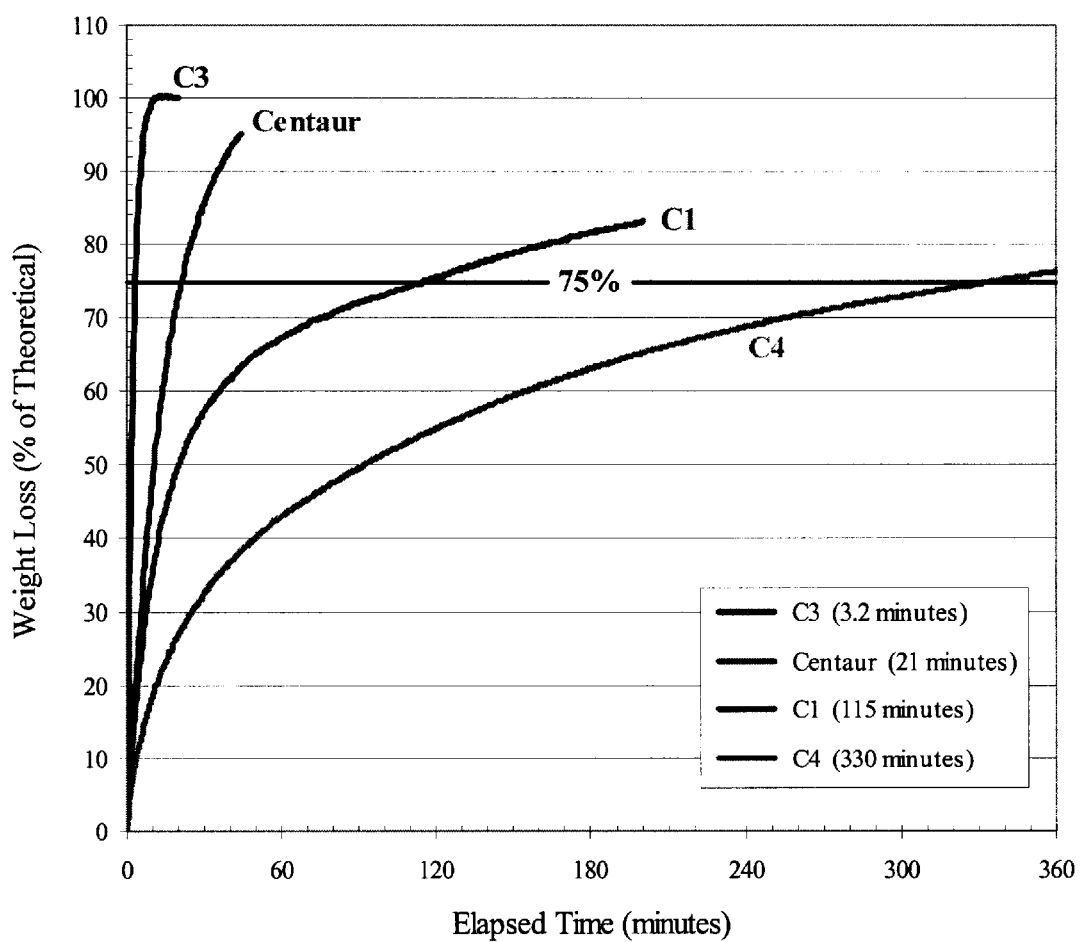
FIG. 3 is a graphical representation of hydrogen peroxide ($H_2O_2$) decomposition rates for invention carbon products and prior art carbon product.

The large difference between the catalytic activities of the C1 and C4 invention carbons and the prior art Centaur product is further exemplified in FIG. 3, where the weight loss due to the evolution of oxygen during the decomposition of the hydrogen peroxide solution is shown as a function of time. The two lower curves for the C1 and C4 products reflect their relatively low activity towards hydrogen peroxide decomposition compared to the Centaur product. Despite this, the C4 and C1 products exhibited 170–230% of the performance of the Centaur product for removal of chloramine (50 and 70%, respectively, compared to 30% for Centaur). Conversely, the C3, C6, and C2 products in Table I exhibited fast "t¾ times," 3.2, 4.3, and 6.8 minutes respectively, but the performance gains in removal of chloramine were modest relative to the C1 product. Yet, all sample invention activated carbon products exhibited far superior abilities for removal of chloramine over the '458 patent product.

Figure 4:
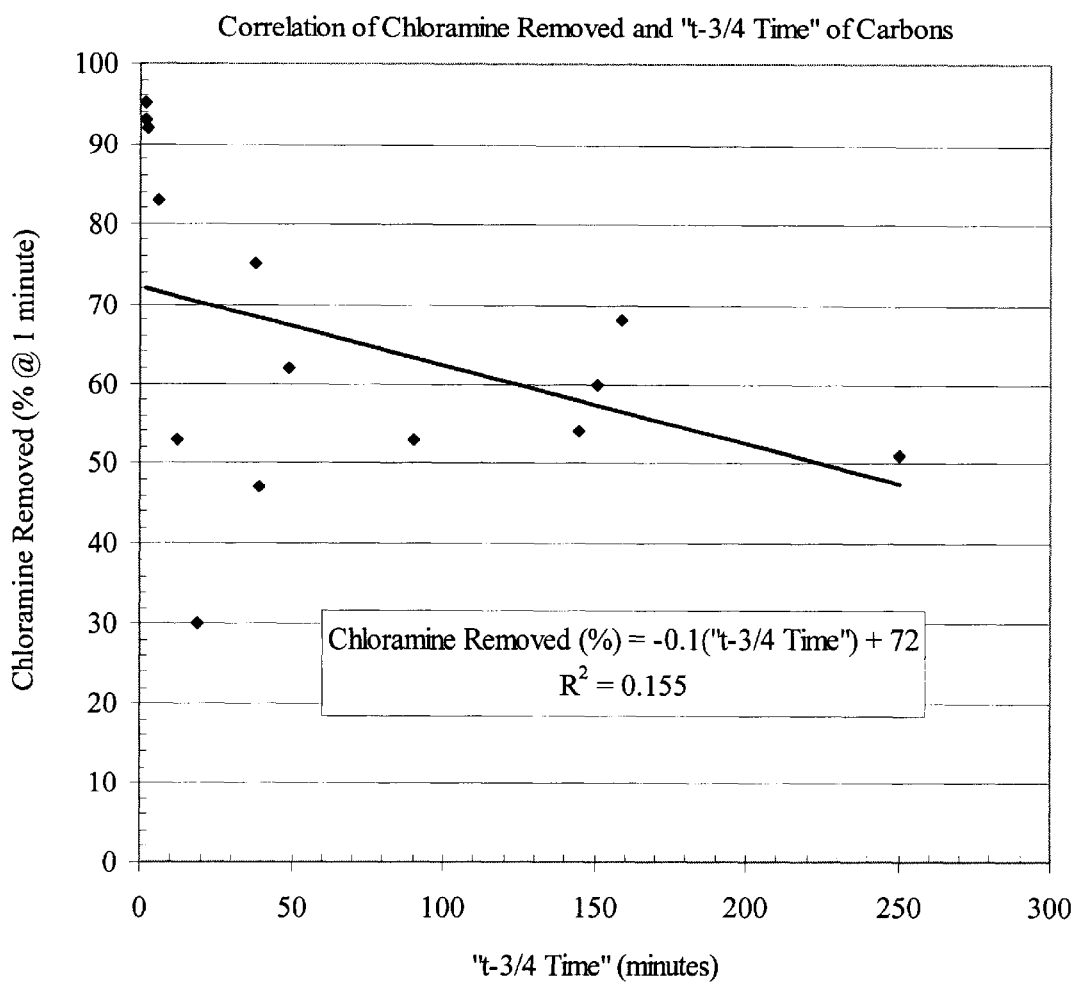
FIG. 4 is a graphical representation of the lack of the correlation between the chloramine-reduction performance and the "t¾ time" of catalytic carbon products.

Inasmuch as the surrogate "¾ time" test is essentially equivalent to the ¾ time test of the '458 patent, it appears from the data presented that the time measure of the decomposition of 75% of the theoretical weight loss of oxygen from the available hydrogen peroxide occurring in the presence of a given amount of carbon is not an accurate indication of that carbon's ability to remove chloramine from drinking water. This is exemplified in graphical form in FIG. 4, which demonstrates that there is a very poor correlation between "¾ time" and the chloramine reduction performance of catalytic carbons (i.e., very low regression coefficient, "$R^2$," of 0.155). The applicants have shown that carbons with "¾ times" well beyond the time taught in the '458 patent to be extremely poor candidates for removing chloramine, in fact, are much better candidates than those taught as excellent candidates in said patent disclosure. The conflict between the date presented herein and the faulty teaching of the '458 patent begs the question, "What carbon material characteristic (or characteristics), then, will provide an accurate indication for enhanced removal of chloramine?"

Figure 5:
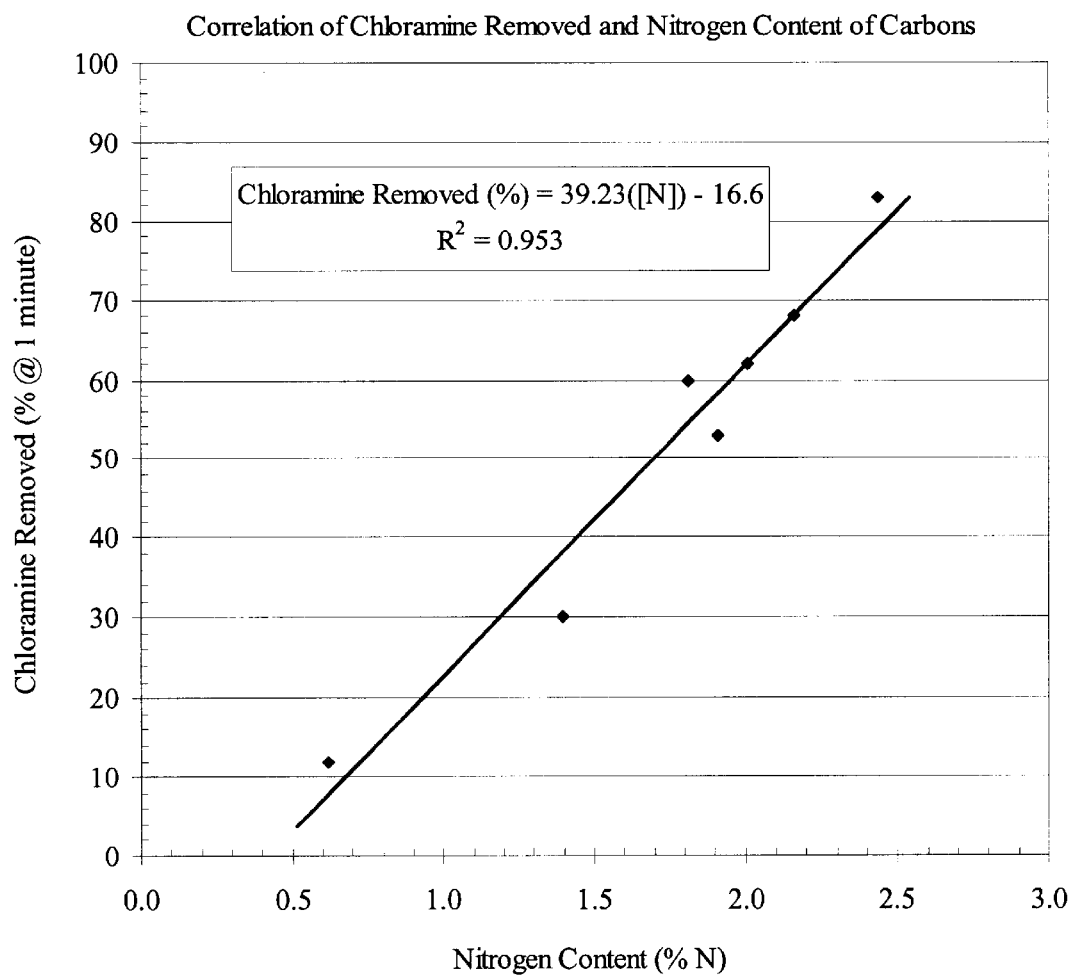
FIG. 5 is a graphical representation of the correlation between the chloramine-reduction performance and the nitrogen content of catalytic carbon products.

Though the patentees do not claim to understand fully the chemical and physical mechanisms involved that result in one carbon material being exposed to ammonia or another nitrogen-containing compound in a certain way versus another carbon material being exposed to ammonia or another nitrogen-containing compound in a different way that permits one of said materials to remove chloramine more effectively than the other of said materials; however, one possible theory to explain such a result involves differing ways the nitrogen enhancement of the carbon occurs. While the applicants do not wish to be bound by any particular theory, it is proposed that the manner of imparting catalytic activity to the carbon material, as claimed herein, results in the nitrogen occurring on the respective catalyzed carbon materials in a different form (e.g., differing functional groups), and the relative success in the carbon's ability to remove chloramine may depend on the presence and amount of a particular nitrogen group or the relative proportions of one particular nitrogen group versus another. Moreover, in some cases nitrogen may be present on the carbon material prior to the exposure to ammonia, wherein the critical processing effect may be in the transformation of the nitrogen present on the carbon into a form more suited to removal of chloramine as well as providing additional such nitrogen forms. Further studies may be required to confirm this hypothesis. Certainly, however, the data shown graphically in FIG. 5 indicate that there is a good correlation between the nitrogen content and the catalytic activity of carbon products with respect to chloramine reduction in water (i.e., relatively high regression coefficient, "$R^2$," of 0.953).

Solid Carbon Block

For various reasons, the water filter industry favors carbon blocks for POE and POU filters. Primarily, in such form they are easy to handle and exhibit lower dust levels. Both of these facts are more conducive to filter change-outs by the consumer. In the manufacture of the carbon blocks, the carbon is blended with a suitable binder, typically high-density polyethylene, and the carbon block formed though a number of distinct, proprietary processes.

Example 4

In a laboratory test, an invention carbon product (50×200 mesh particle size) was melt-blended with high-density polyethylene (HDPE) powder at a level of 20% of the dry carbon weight (1 part binder to 5 parts carbon). The solid block formed from the carbon and HDPE binder was crushed and screened to give material that was >90%−325 mesh particle size. The Centaur prior art carbon product was similarly melt-blended with HDPE, and the resulting block crushed to −325 mesh particle size. Using a 3 ppm chloramine solution in water, the chloramine reduction performance of each of the powdered, HDPE-treated carbons was determined in a manner similar to that described in Example 1. The amount of sample in each test corresponded to 200 mg of carbon (dry basis). The data obtained are summarized in Table II, together with the corresponding data for the original carbons (not treated with HDPE). The data are also shown graphically in FIG. 6 to permit a visual comparison.

TABLE II

Influence of HDPE Binder on
Chloramine Removal Performance of Catalytic Carbons

| Contact Time (minutes) | Amount of Chloramine Removed (%) | | | |
|---|---|---|---|---|
| | Invention Carbon | | Prior Art Carbon (Centaur) | |
| | Without Binder | With Binder | Without Binder | With Binder |
| 2 | 83 | | 45 | |
| 3 | | 87 | | 26 |
| 5 | 100 | 100 | 82 | 42 |
| 10 | 100 | 100 | 100 | 60 |
| 15 | 100 | 100 | 100 | 69 |

Figure 6:
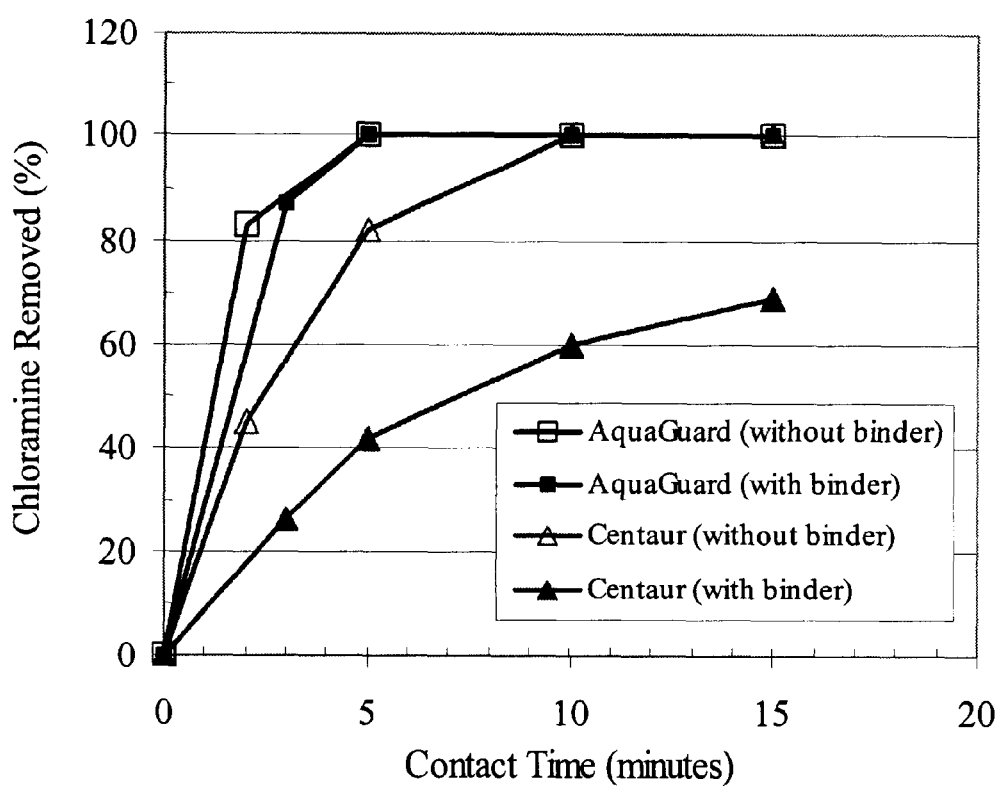
FIG. 6 is a graphical representation of the influence of polyethylene binder on the chloramine-reduction performance of invention carbon product and prior art carbon product.

It is apparent from FIG. 6 and Table II that melt-blending the invention carbon with HDPE binder did not impact the chloramine reduction performance of the invention carbon. In a time frame relevant to POU filters, chloramine in the test water was quickly reduced by both the original prior art carbon and the HDPE-treated prior art carbon. In marked contrast, however, it is equally apparent from FIG. 6 that the HDPE binder had a pronounced, adverse impact on the chloramine reduction performance of the prior art Centaur product. The performance of the prior art carbon product was reduced by over 50% following melt-blending with the HDPE binder at the 20 wt% level typically used for filter block manufacture. This substantial loss in chloramine reduction performance of the prior art carbon was attributed to, as mentioned earlier, the poor wetability of the Centaur product, which is exacerbated upon addition of a hydrophobic binder such as polyethylene. In fact, although the same test protocol was used for both the invention and prior art carbon products, it was necessary to add a small amount of surfactant to the water containing the prior art carbon to get the carbon to wet at all. In the absence of the surfactant, the HDPE-treated prior art carbon did not wet over the fifteen-minute time frame of the test, resulting in little measurable chloramine reduction in the test water. In marked contrast, the invention carbon product readily wetted in both the virgin and blended forms, did not require a surfactant, and exhibited substantially superior chloramine removal performance.

In summary, the invention carbon could be formed into blocks, using a standard polyethylene binder, without loss of chloramine reduction capacity.

While presently preferred embodiments of the invention have been described in detail, the invention may be otherwise embodied within the scope of the appended claims.

What is claimed is:

1. A process for the removal of chloramines from fluid solutions or streams comprising the step of contacting said solutions or streams with an activated carbon that has been treated by a process of pyrolyzing the carbon while simultaneously passing a gas stream comprised of a mixture of $NH_3$ and an oxygen-containing gas through the carbon, wherein the treated activated carbon is in the form of a solid block, the activated carbon is derived from lignocellulosic material, and the process achieves greater than 65% chloramine removal.

2. The process as set forth in claim 1 wherein the carbon treatment gas stream includes a $NH_3$/oxygen-containing gas mixture from the group consisting of $NH_3/CO_2$, $NH_3/O_2$, $NH_3/H_2O$, and $NH_3/NO_x$.

3. The process as set forth in claim 2 wherein the $NH_3$/oxygen-containing gas mixture is in a ratio of up to 10:90 for a time sufficient to remove surface oxides from the carbon.

4. The process as set forth in claim 3 wherein the $NH_3$/oxygen-containing gas mixture is $NH_3/H_2O$.

5. The process of claim 1 wherein the solutions or streams are aqueous.

6. The process of claim 1 wherein the pyrolyzing temperature is above about 700° C.

7. The process of claim 1 wherein the solid block of activated carbon is prepared by blending particles of carbon with a binder and shaping the blend.

8. The process of claim 7 wherein the binder is a polymeric material and the blending occurs at elevated temperature and the shaping occurs prior to cooling.

9. The process of claim 8 wherein the binder is a high-density polyethylene and the blending occurs at a temperature above its glass transition temperature.

10. The process as set forth in claim 1 wherein the process achieves greater than 75% chloramine removal.

* * * * *

UNITED STATES PATENT AND TRADEMARK OFFICE
CERTIFICATE OF CORRECTION

PATENT NO. : 6,706,194 B2
DATED : March 16, 2004
INVENTOR(S) : Frederick Stanley Baker and Jane Fiona Byrne It is certified that error appears in the above-identified patent and that said Letters Patent is hereby corrected as shown below:

Column 2,
Line 4, delete "carbbn's" and insert therefor -- carbon's --.
Lines 46 and 47, delete "temperature (preferably, above its melting point)," and insert therefor -- temperature, preferably above its melting point, --.

Column 4,
Line 2, delete "The applicants' found" and insert therefor -- The independent test data indicated, and the applicants' findings support, --.

Column 8,
Lines 10 and 19 delete ""¾ time"" and insert therefor -- "t-¾ time" --.
Line 11, "¾ time" and insert therefor -- t-¾ time --.
Line 22, delete ""¾ times"" and insert therefor -- "t-¾ times" --.

Signed and Sealed this

Twentieth Day of July, 2004

JON W. DUDAS
*Acting Director of the United States Patent and Trademark Office*